Dec. 4, 1951     H. R. DENTON     2,577,183
METHOD OF HEAT SEALING PLIOFILM
Filed July 28, 1947     2 SHEETS—SHEET 1
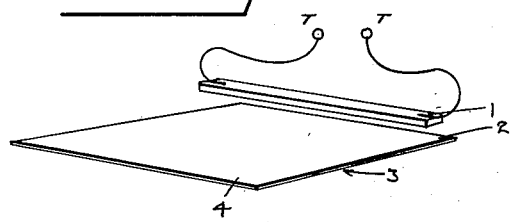
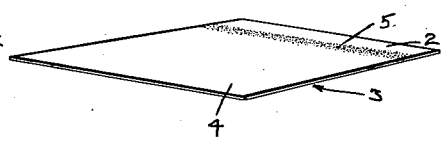
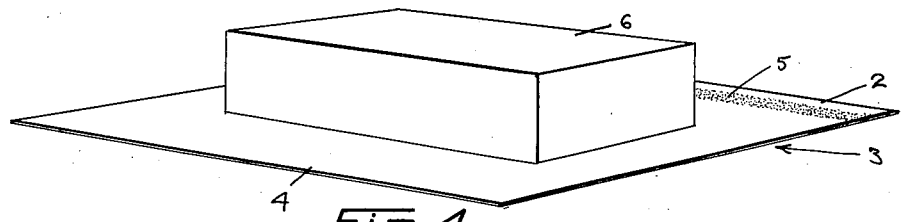
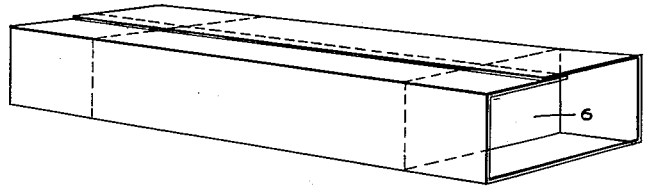
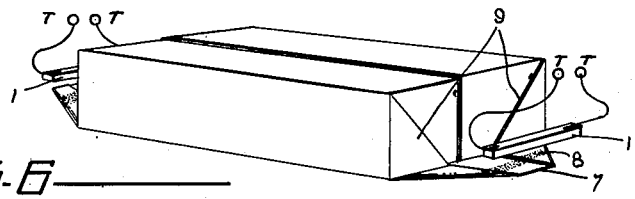
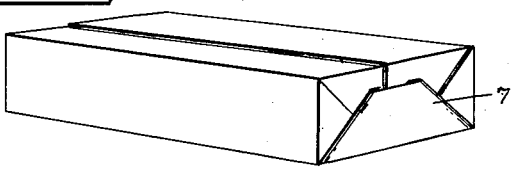
INVENTOR.
HARVEY R. DENTON
BY
Boyken, Mohler & Beckley
ATTORNEYS Dec. 4, 1951          H. R. DENTON          2,577,183
METHOD OF HEAT SEALING PLIOFILM
Filed July 28, 1947          2 SHEETS—SHEET 2
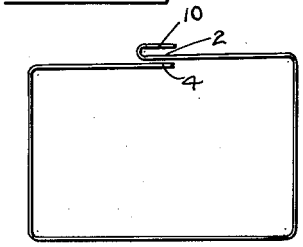
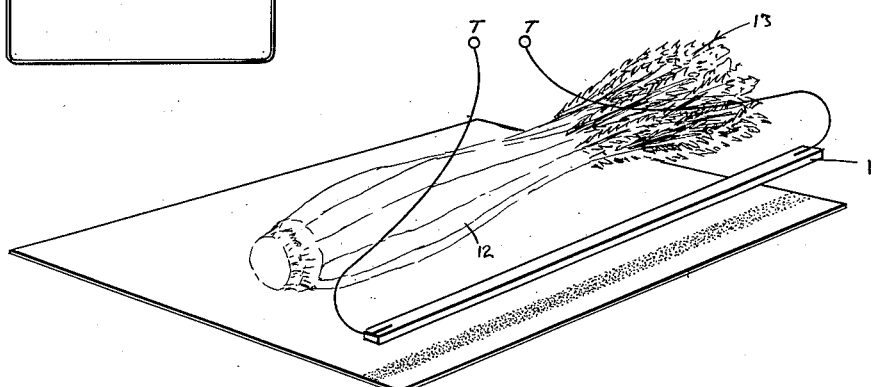
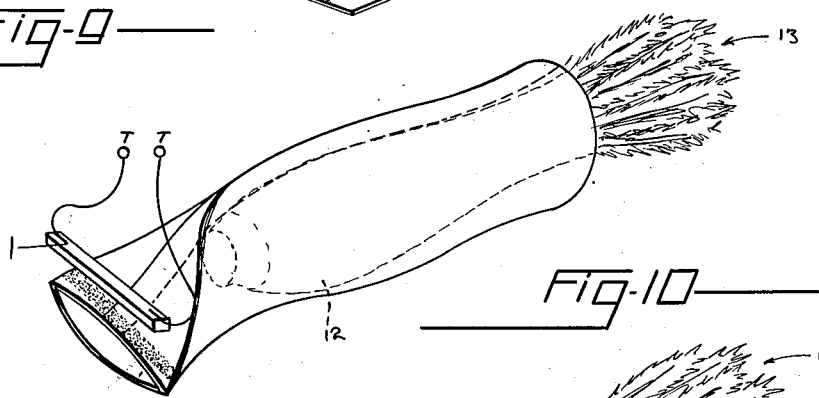
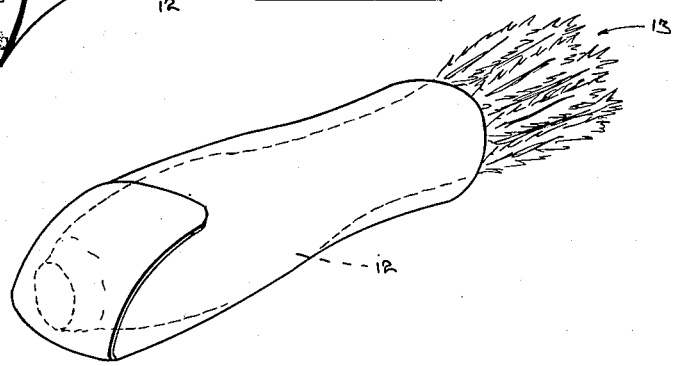
INVENTOR.
HARVEY R. DENTON
BY
ATTORNEYS Patented Dec. 4, 1951

2,577,183

UNITED STATES PATENT OFFICE 2,577,183

METHOD OF HEAT SEALING PLIOFILM

Harvey R. Denton, Oakland, Calif.

Application July 28, 1947, Serial No. 764,150

3 Claims. (Cl. 154—116)

This invention relates to a method of heat sealing a thermo-sealing material, such as chlorinated rubber, rubber hydrochloride which is also known under the trade name of Pliofilm, etc.

One of the objects of the invention is to provide a method of heat sealing a thermo-sealing material, such as Pliofilm or chlorinated rubber, that will overcome the present difficulties in so sealing such material, one of which is the accidental destruction of the seal through melting the Pliofilm and another of which is through unintentionally forcing the heater through the film due to the heretofore combination of heat and pressure that is essential to making the seal.

Another object of the invention is the provision of a method that makes possible the rapid wrapping of regular and irregular objects with thermoplastic materials, such as Pliofilm, and the like, and which material has the characteristic of remaining tacky or plastic for a period of time after heat has been applied to it.

Heretofore it has been the practice in wrapping an object in Pliofilm, and the like, to wrap the object in a sheet of such material and to overlap the opposite ends or marginal portions at one side of such object. A heater, such as a heated bar, is then applied to the overlapped marginal portions causing them to fuse together when the heat has penetrated sufficiently.

The above method is a rather slow process inasmuch as the wrapper must be held in place while the overlapped marginal portions are heated, and it is not applicable to wrapping and sealing irregularly shaped objects. A further objection, whether the object is regular or otherwise, is that the object being wrapped must be subjected to heat along the line where the heater bar is applied. Thus, heat sealing wrappers on fresh fruits and vegetables, and other objects susceptible to damage from heat, is precluded.

By the present invention irregularly shaped objects and the most delicate of objects may be wrapped and heat sealed in Pliofilm, and the like, in perfect safety.

Other objects and advantages will appear in the specification.

In the drawings, Figs. 1 to 7 show, in a simplified manner, the successive steps of wrapping an object in a sheet of thermoplastic material, such as Pliofilm, and heat sealing the wrapper in position about the object.

Fig. 1 shows the heated bar in position for application to one marginal portion of a sheet.

Fig. 2 shows the tacky or plastic line on said marginal portion after application of the heated bar.

Fig. 3 shows a package on said sheet.

Fig. 4 shows the tacky marginal portion overlapping the opposite unheated marginal portion of the sheet after the sheet is wrapped around the object to bring said opposite marginal portions in overlapping relationship.

Fig. 5 shows one end folded preparatory to sealing with the outer closing flap rendered tacky or plastic by application with a heated iron.

Fig. 6 shows the end flap sealed closed, it being understood that both ends are similarly sealed.

Fig. 7 diagrammatically shows a further step that is many times applied between the steps shown in Figs. 4, 5, if desired, particularly where the packages are stacked so that the heat sealed side will engage the bottom of a superposed package.

Fig. 8 shows an irregular object, such as celery, on a sheet of Pliofilm, rubber hydrochloride, or the like, with one margin of the Pliofilm rendered tacky in the same manner as in Fig. 1.

Fig. 9 shows the sheet sealed along the overlapped margins.

Fig. 10 shows the bottom extension closed over and sealed.

In the following description the word "Pliofilm" will be used to identify the wrapper and this word is used generically to identify any sheet material suitable for use as a wrapper that has substantially the same thermoplastic characteristics as Pliofilm or rubber hydrochloride.

In detail, a conventional heat sealing device that includes an electrically heated and thermostatically controlled bar 1 is applied to one of the marginal portions 2 of a sheet 3 of Pliofilm, said marginal portion being one that will overlap the opposite marginal portion 4 of said sheet when the sheet is wrapped about the object to be enclosed within the sheet, and the side to which the bar is applied is the side that will engage the marginal portion 4.

The heated bar 1 may be in a manually operated heat sealer as shown, or it may be in an automatic wrapping machine. In either place or in either device the function of the bar and its temperature is the same where used for heat sealing Pliofilm, the temperature usually being between 300° F. and 400° F., and the thermostat set for whatever particular temperature is desired according to the period of "dwell" on the Pliofilm, which in turn may be determined by the thickness of the sheet.

Whatever the temperature may be, say 350° F. for example, when applied to the Pliofilm, the latter is quickly rendered tacky or plastic. If held too long the Pliofilm will melt and stick to the iron, and if not held long enough there will be no heat sealing. The proper time of application is quickly and easily determined and when once determined for the particular Pliofilm being used it will remain substantially the same for the run.

Heretofore the practice has been to overlap margins of the sheet, such as marginal portions 2, 4 and then to apply the heated iron to the outer side of the outermost layer, depending upon sufficient transfer of heat through said outermost layer and to the underlying layer to render the engaging surfaces sufficiently plastic to stick them together. Naturally, by this method the overlapped marginal portions must be held together by pressure during application of the heated iron, and the object being wrapped must form the support of said margins. Pressure of the iron against the layers and against the object to be wrapped by this method is essential to making an effective seal. The result many times has been that the outer layer of Pliofilm (and sometimes both layers) upon becoming sufficiently soft and plastic have been cut through by the pressure of the iron, thus destroying the seal. In any event, the temperature and time of application of heat and amount of pressure employed by the conventional method has been so critical in their relationship to each other as to create serious objections to the use of Pliofilm.

As seen in Figs. 2, 3, the strip or line 5 along the marginal portion 2 of the sheet, and where the bar 1 has engaged said portion, will be rendered tacky or plastic, and will also be hot.

The object 6 to be wrapped (Fig. 3) is then quickly placed on sheet 3 and the latter is wrapped around the object so that the marginal portion 4 will underlie the tacky line or strip 5 and will engage the tacky line or strip in heat transfer relationship to which underlying portion the tacky part will quickly adhere and if the wrap is relatively fast, the heat from the tacky portion will transfer to the unheated portion heating the latter to facilitate the sticking of the two engaging surfaces. No pressure, as in conventional heat sealing methods, is required inasmuch as the tacky portion has a particular affinity for adhering to the unheated marginal portion 4. The operator merely need bring them into engaging relationship while the line or strip 5 is hot and tacky and the seal will be effective.

After the seal along line 5 is effected, the ends of the sheet at the ends of the object 6 (Fig. 5) may be folded over in the conventional manner to provide an overlying tab 7 that may be touched with the sealing iron to render it tacky at 8, and the flap then closed against the previously folded side and end flaps 9. Of course, the heated iron or bar may be brought into contact with the sheet at any desired point or along any desired lines or stripes during the sealing of the warpper, but in any event, it is not used to directly press and seal two sheets together, but merely to supply heat to one of the sheets for rendering it hot and plastic so it will stick to the other sheet or portion of the same sheet and transfer its heat to such other sheet or portion for rendering the latter tacky or plastic also.

In Fig. 7 is shown an additional step that may be practiced where packages, after the wrapper is sealed, are to be stacked one on the other.

In this form the heated line or strip is spaced from the adjacent edge of the sheet a sufficient distance to provide a free marginal strip 10 between said heated part and said free edge. After the seal is effected, the marginal portion 10 is folded over the heated line or strip so there will be no chance for the tacky portion to engage the wrapper of a container that is placed thereagainst. In other words, the marginal portion 10 will be interposed between the tacky part and the other package. This marginal portion will usually adhere to the heated part therebelow.

In Figs. 8, 9, 10 are shown the same steps as are shown in Figs 1 to 8, except that the object that is wrapped is indicated as being celery 12, with the leafy end 13 projecting from the wrapper. The same numbers are used to identify identical structure. Of course, with other irregular objects, both ends may be sealed.

It is very important to note that with the present invention the Pliofilm sheet is heated on one surface only, and the Pliofilm is not stretched so as to weaken the same in any manner, nor is the object that is enclosed thereby subject to compression or to excessive heat. If both sheets to be joined were heated the object to be enclosed would also be heated and the Pliofilm would be undersirably weakened.

I claim:

1. The method of securing a first portion of a sheet of thermo-sealing plastic material to a second portion of the same material that comprises the steps of: transmitting sufficient heat from a source thereof to one side of said first portion to heat and to soften said one side to a tacky condition, then removing said first portion from the influence of said source of heat and immediately thereafter and while it has substantially all of the heat absorbed thereby and is tacky simultaneously softening one side of said second portion and fusing it with said tacky side of said first portion by bringing the hot tacky side of said first portion into engagement and into direct heat transfer relationship with said one side of said second portion.

2. The method of securing two portions of Pliofilm together that comprises the steps of: softening one side of one portion to a hot tacky condition by transfer of heat thereto from a source of heat, then softening one side of said second portion and fusing it with the tacky side of said first portion solely by bringing said hot tacky side into direct heat transfer relationship with said one side of said second portion away from the influence of heat from said source so that the heat so transferred from said one side of said one portion to said one side of said second portion will be the sole means for softening said last mentioned side.

3. The method of securing two portions of chlorinated rubber together that comprises the steps of: softening one side of one portion to a hot tacky condition by transfer of heat thereto from a source of heat, then softening one side of said second portion and fusing it with the tacky side of said first portion solely by bringing said hot tacky side into direct heat transfer relationship with said one side of said second portion away from the influence of heat from said source until sufficient heat required to soften said one side of said second portion has been transferred from the hot tacky side of said one portion to said one side of said second portion.

HARVEY R. DENTON.

REFERENCES CITED

The following references are of record in the file of this patent:

UNITED STATES PATENTS

| Number | Name | Date |
| --- | --- | --- |
| 1,481,757 | Stokes | Jan. 22, 1924 |
| 2,082,114 | Littlefield | June 1, 1937 |
| 2,196,982 | Cox | Apr. 16, 1940 |
| 2,233,945 | Gurwick | Mar. 4, 1941 |
| 2,434,617 | Hoppe | Jan. 13, 1948 |
| 2,438,089 | Carson | Mar. 16, 1948 |
| 2,441,513 | Schmitt | May 11, 1948 |